(12) United States Patent
Blackwell et al.

(10) Patent No.: US 7,325,003 B2
(45) Date of Patent: Jan. 29, 2008

(54) METHOD AND SYSTEM FOR MAPPING DATASOURCES IN A METADATA MODEL

(75) Inventors: Richard Blackwell, Ottawa (CA); Glenn Rasmussen, Nepean (CA)

(73) Assignee: Cognos Incorporated, Ottawa, Ontario (CA)

( * ) Notice: Subject to any disclaimer, the term of this patent is extended or adjusted under 35 U.S.C. 154(b) by 496 days.

(21) Appl. No.: 10/884,159

(22) Filed: Jul. 2, 2004

(65) Prior Publication Data

US 2006/0004812 A1    Jan. 5, 2006

(51) Int. Cl.
    *G06F 17/30* (2006.01)
(52) U.S. Cl. ............................... 707/102; 717/104
(58) Field of Classification Search ................ 707/101, 707/102, 104.1; 717/104, 105
    See application file for complete search history.

(56) References Cited

U.S. PATENT DOCUMENTS

| | | | | |
|---|---|---|---|---|
| 5,724,556 A | * | 3/1998 | Souder et al. ................. | 703/2 |
| 5,802,514 A | * | 9/1998 | Huber ........................... | 707/4 |
| 5,966,707 A | * | 10/1999 | Van Huben et al. ........... | 707/10 |
| 6,502,103 B1 | * | 12/2002 | Frey et al. .............. | 707/103 R |
| 7,085,697 B1 | * | 8/2006 | Rappaport et al. ............ | 703/13 |
| 2002/0082818 A1 | * | 6/2002 | Ferguson et al. ............. | 703/22 |
| 2005/0055306 A1 | * | 3/2005 | Miller et al. .................. | 705/37 |

* cited by examiner

*Primary Examiner*—Leslie Wong
(74) *Attorney, Agent, or Firm*—Pearne & Gordon LLP (57) ABSTRACT

A method and system for mapping datasources in a metadata model that provides datasource connections that are structurally isolated from the metadata model and which incorporate physical datasource addressing information for mapping a logical datasource structured within the metadata model to a particular physical datasource "on-the-fly", and in a run-time environment. In an embodiment of the present invention, security can be implemented to limit user access leveraging an organization's security regime.

10 Claims, 9 Drawing Sheets

METHOD AND SYSTEM FOR MAPPING DATASOURCES IN A METADATA MODEL

FIELD OF THE INVENTION

The present invention relates generally to electronic data modeling techniques, and more particularly to the mapping of datasources within a metadata model.

BACKGROUND OF THE INVENTION

Database management systems (DBMS) can be classified as either record-based systems or object-based systems. Both forms of DBMS's typically enlist a data "model" to describe data as well as that data's structure, relationships, and constraints within a database. Data models are also referred to as metadata models since they store metadata, or data about the composition of data in a database in order to describe the manner in which data is structured within a database.

One type of metadata model frequently employed In Business information (BI) systems is a metadata reporting model that includes a set of database information that has been packaged for use in the reporting component of the BI system. Unfortunately, metadata reporting models have generally been developed on an ad hoc basis over time in order to meet the particular needs of a specific group of users. Thus, prior art methods for making changes to targeted sources of data within a metadata model have necessitated the writing of customized program logic to re-target a given report at a different datasource in response to a new set of reporting requirements.

In conventional reporting models, a data model designer typically first creates a logical design. After that logical design has been completed, the designer then establishes a physical design that reflects how data is to be represented in a database. The designer subsequently creates a corresponding storage scheme, or in other words the structure that a database takes. "Hard-coded" mappings between the metadata model and a datasource are then provided within that metadata model.

The problem is that these prior art reporting models use undesirably rigid methods of mapping a datasource against a report. As such, existing metadata models are incapable of retrieving data from a different datasource without having to re-write program logic. This presents significant difficulties since a typical user has little or no knowledge of the underlying program logic, let alone any capacity to re-write mapping logic. The result is a "disconnect", as the process is taken out of the user's workflow while the user awaits completion of code rewrites to make the necessary changes.

What is needed is a metadata model that allows for the retrieval of data from differing datasources "on-the-fly", and in a more user-friendly manner without the need to re-write customized code.

For the foregoing reasons, there is a need for an improved method and system for mapping datasources in a metadata model.

SUMMARY OF THE INVENTION

The present invention is directed to a method and system for mapping datasources in a metadata data model. The method includes the steps of structuring a logical datasource within the metadata model, constructing one or more than one datasource connection each structurally isolated from the metadata model, incorporating physical datasource mapping information within each datasource connection respectively, associating the logical datasource with one or more than one datasource connection, and mapping the logical datasource to one or more than one physical datasource using respective mapping information incorporated within the datasource connections associated with the logical datasource.

In an embodiment of the present invention, the method further includes the step of limiting access to a physical datasource by user and/or user group.

In an embodiment of the present invention, the method further includes the step of prompting a user to select a single source connection when two or more datasource connections are accessible.

In an embodiment of the present invention, the method further includes the step of defining a name-binding to enable an application to handle local variances in database element names for a connection.

In an embodiment of the present invention, the method further includes the step of prompting to resolve ambiguities such as multiple connections or credentials available or to obtain missing information, such as database credentials.

The system includes a logical datasource structured within the metadata model, one or more than one datasource connection associated with the logical datasource, and structurally isolated from the metadata model, and physical datasource mapping information incorporated within each associated datasource connection for mapping the logical datasource to applicable physical datasources.

In an embodiment of the present invention, the system further includes a security component for limiting physical datasource access by user and/or user group.

In an embodiment of the present invention, the system further includes an interface prompt for prompting a user to select a single source connection when two or more datasource connections are accessible.

The method allows a user to enable access to different databases "on-the-fly" in a run-time environment without requiring changes to the metadata or generated reports.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

Figure 1:
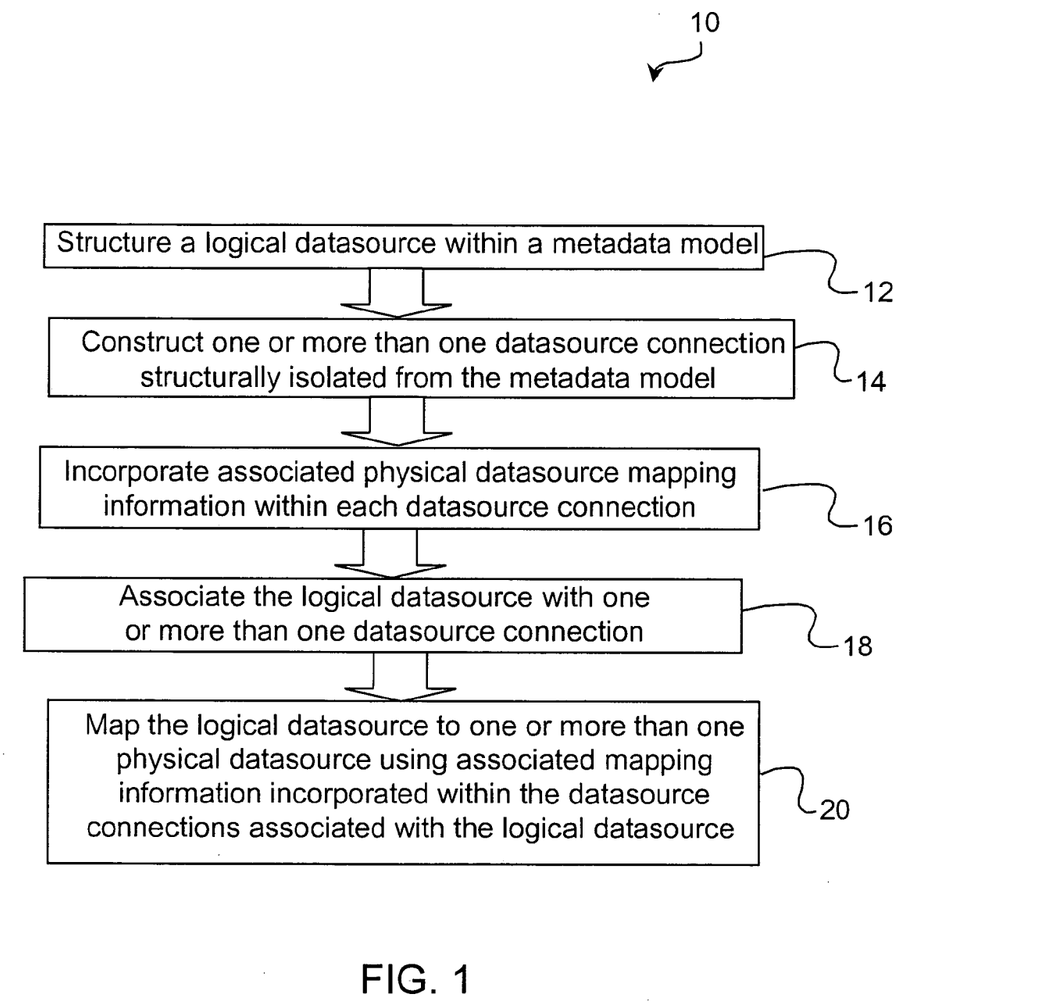
FIG. 1 is an overview of a method for mapping datasources in a metadata model in accordance with an embodiment of the present invention.

An embodiment of the present invention is directed to a method 10 and system 100 for mapping datasources in a metadata model. As illustrated in FIG. 1, the method 10 includes the steps of structuring a logical datasource within the metadata model 12, constructing one or more than one datasource connection structurally isolated from the metadata model 14, incorporating physical datasource mapping information within each datasource connection respectively 16, associating the logical datasource with one or more than one datasource connection 18, and mapping the logical datasource to one or more than one physical datasource using respective mapping information incorporated within the datasource connections associated with the logical datasource 20.

Figure 2:
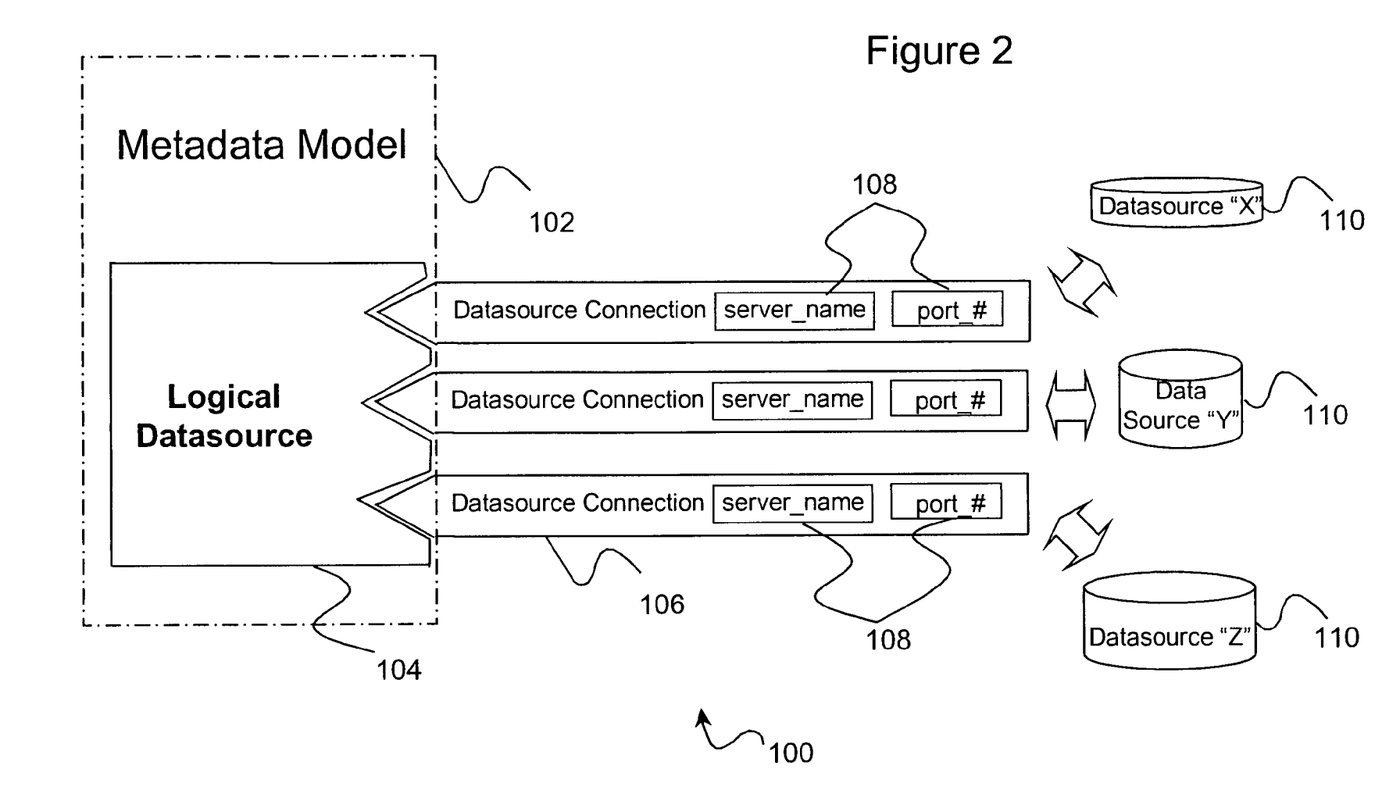
FIG. 2 is an overview of a system for mapping datasources in a metadata model in accordance with an embodiment of the present invention.

As illustrated in FIG. 2, the system 100 includes a logical datasource 104 structured within the metadata model 102, one or more than one datasource connection 106 associated with the logical datasource, and structurally isolated from the metadata model 102, and physical datasource mapping information 108 incorporated within each associated datasource connection 106 for mapping the logical datasource 104 to applicable physical datasources 110.

Figure 3:
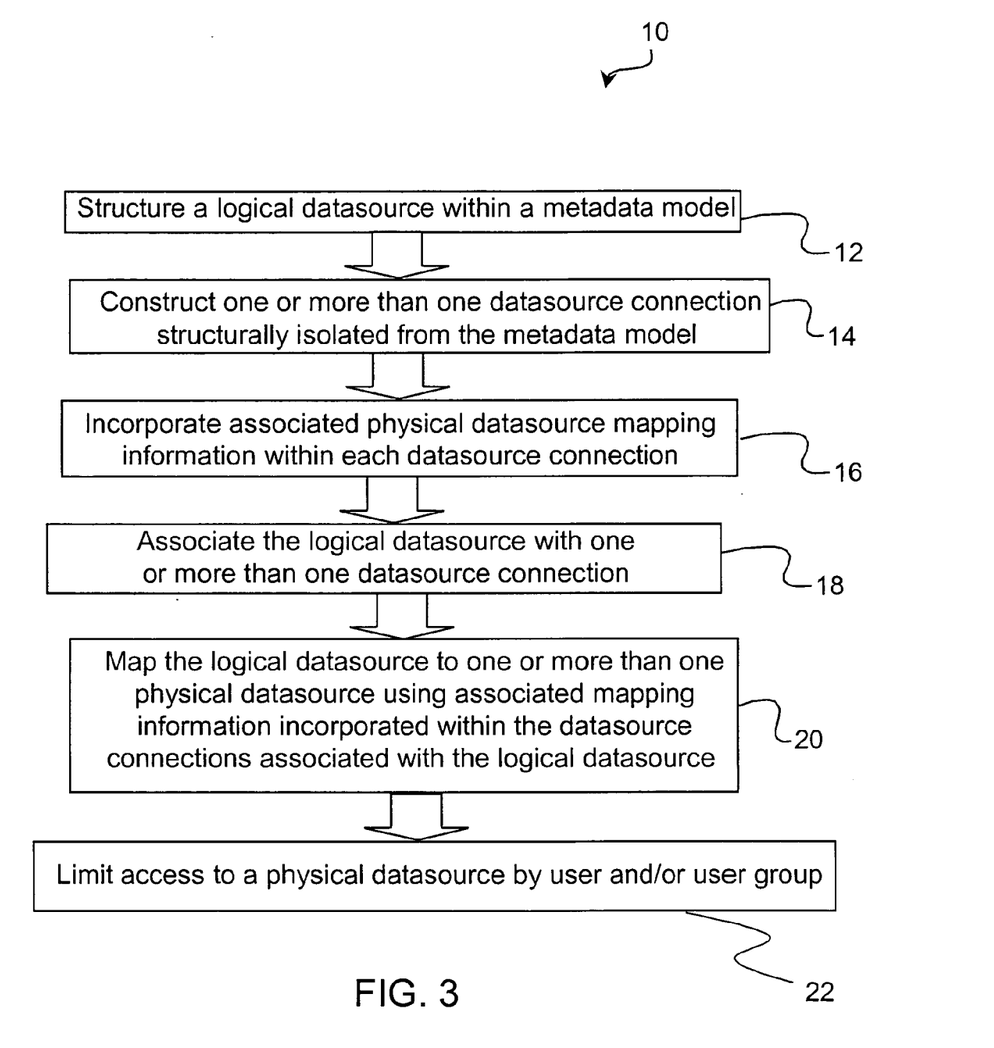
FIG. 3 illustrates the method further including an access-limiting step.

In an embodiment of the present invention as illustrated in FIG. 3, the method 10 further includes the step of limiting access to a physical datasource by user and/or user group 22.

Figure 4:
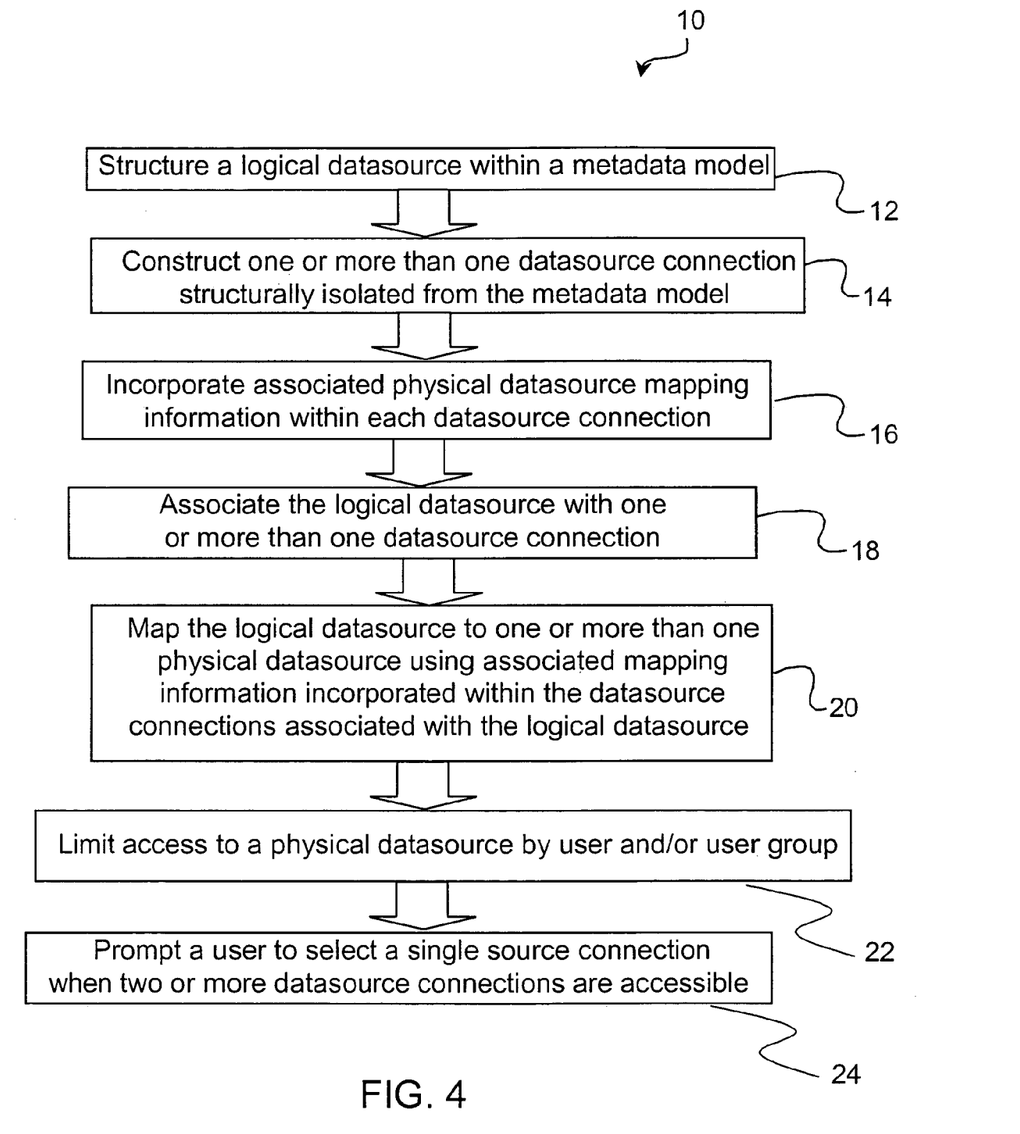
FIG. 4 illustrates the method further including a user-prompting step.

In an embodiment of the present invention as illustrated in FIG. 4, the method 10 further includes the step of prompting a user to select a single source connection when two or more datasource connections are accessible 24.

Figure 5:
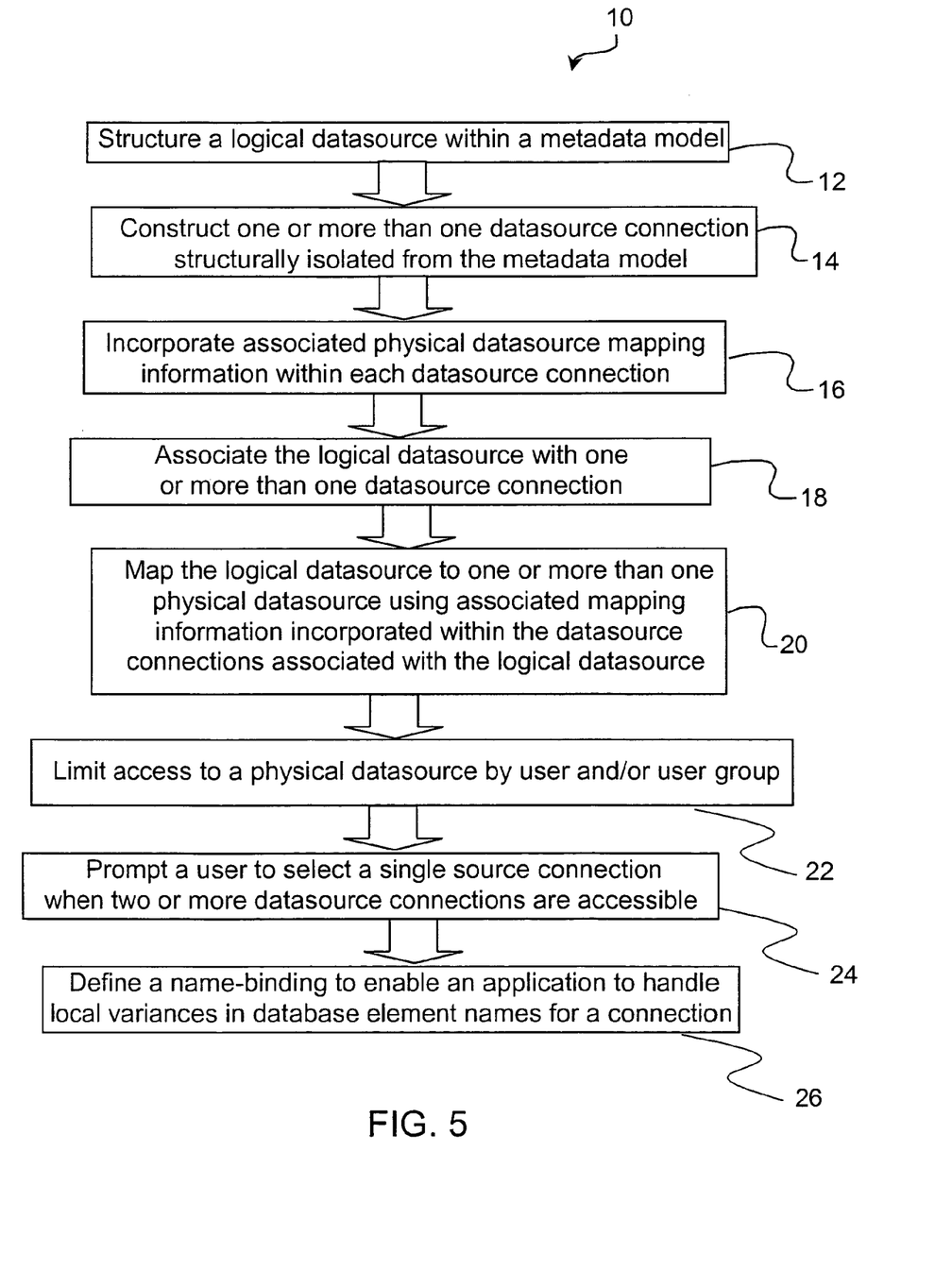
FIG. 5 illustrates the method further including a name-binding step.

In an embodiment of the present invention as illustrated in FIG. 5, the method 10 further includes the step of defining a name-binding to enable an application to handle local variances in database element names for a connection 26.

Figure 6:
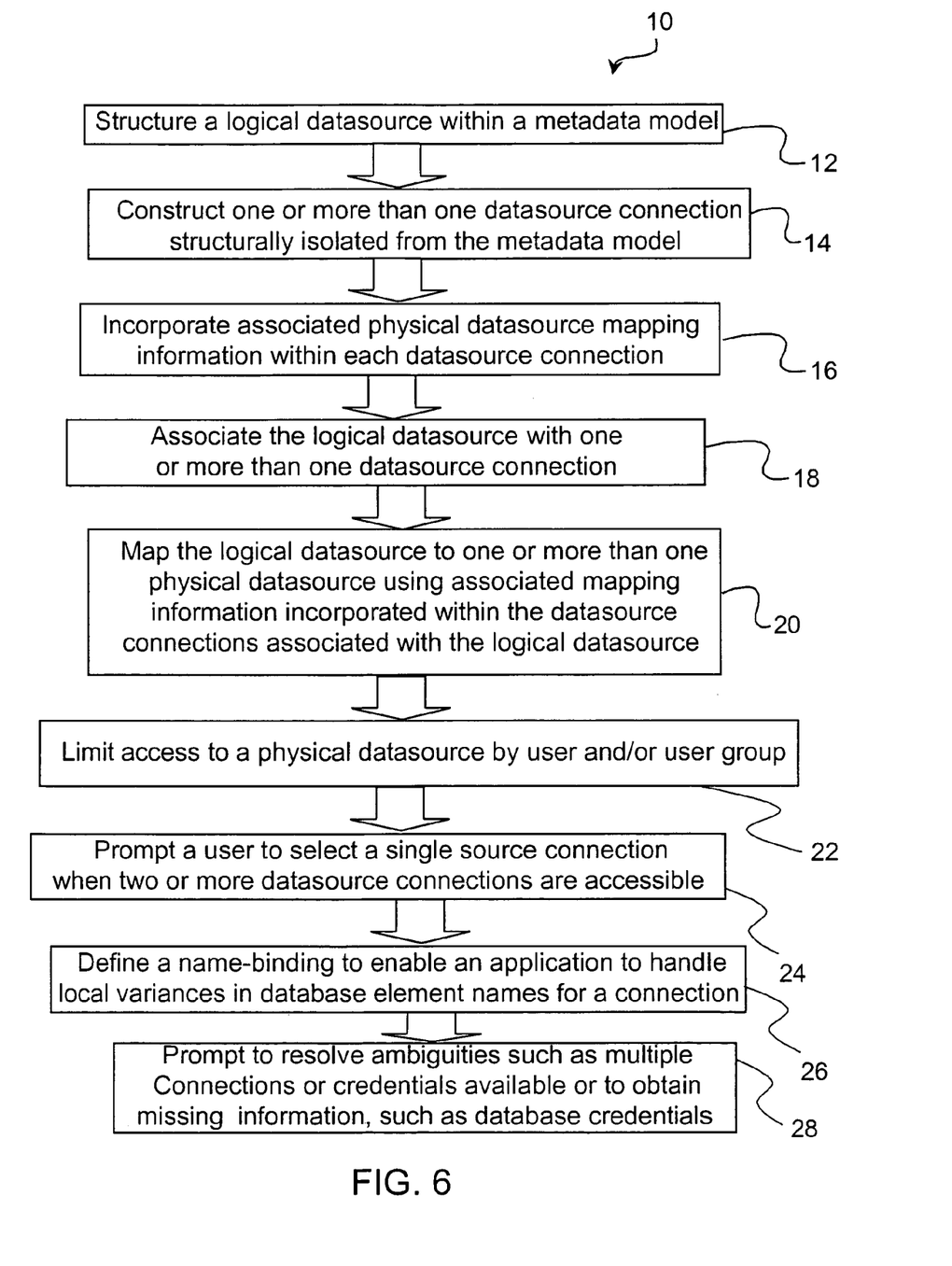
FIG. 6 illustrates the method further including an ambiguity-resolution prompting step.

In an embodiment of the present invention as illustrated in FIG. 6, the method 10 further includes the step of prompting to resolve ambiguities such as multiple connections or credentials available or to obtain missing information, such as database credentials 28.

Figure 7:
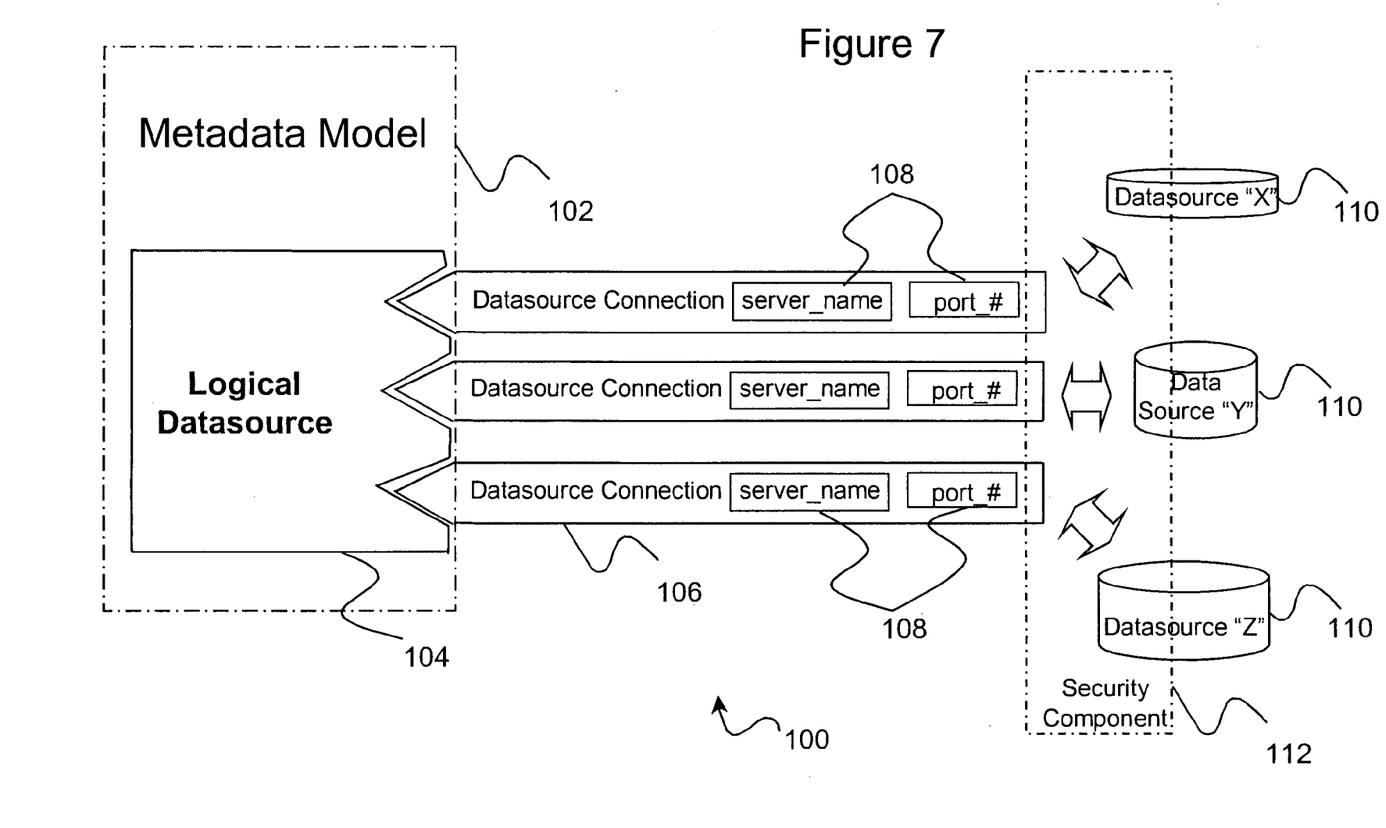
FIG. 7 illustrates the system further including a security component.

In an embodiment of the invention as illustrated in FIG. 7, the system 100 further includes a security component 112 for limiting physical datasource access by user and/or user group.

Figure 8:
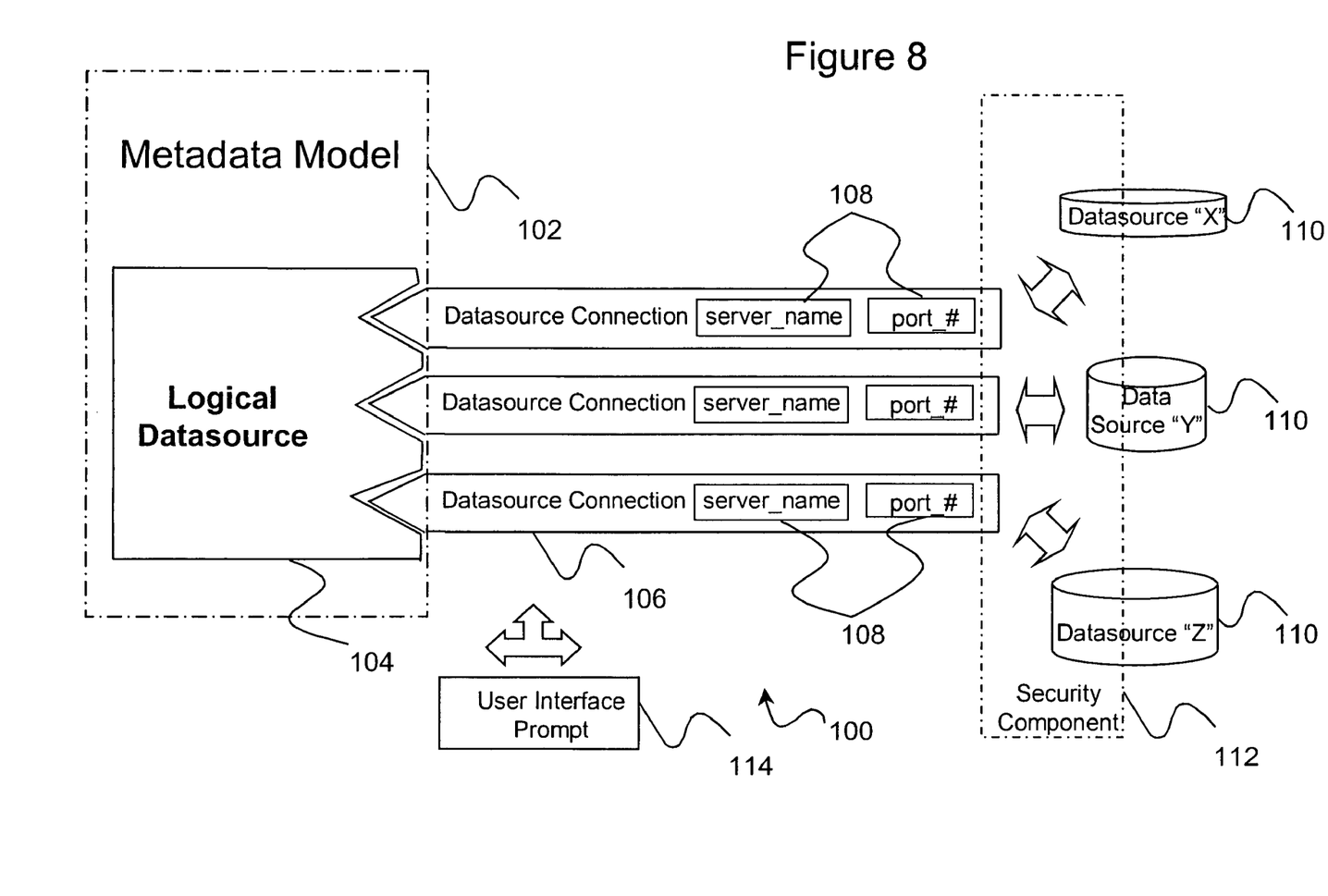
FIG. 8 illustrates the system further including a user interface prompt; for selecting one of several datasource connections.

In an embodiment of the invention as illustrated in FIG. 8, the system 100 further includes an interface prompt 114 for prompting a user to select a single source connection when two or more datasource connections are accessible.

In an embodiment of the present invention, security can be placed on the datasource connections to limit access. Each group of users can be limited to accessing the data specified by the particular view for the group only. By leveraging the organizational security presently provided by the application, privacy and the security of data is provided.

An organization can secure access to individual datasources by user and/or user group in the run-time environment without the requirement for changes to reports, or to the metadata model.

At report execution time, user access privileges to the datasource and subsequently datasource connections are used to determine if the user can access one or more than one database. If the user can access only a single database, then the report is run on that database. However, if the user is granted privileges to access multiple databases, an appropriate user interface is presented to allow the user to select the desired database. In either case, the report is then executed.

The method 10 and system 100 can further allow connections to be secured to restrict access to the connection to a subset of the plurality of users known to the system. The method 10 and system 100 further define a strategy to determine which connection should be used if a user has access to multiple connections. The method 10 and system 100 also allow a plurality of credentials to be associated with a connection. These credentials can be used to gain access to the database.

As with connections, access to credentials can be restricted to a subset of the plurality of users known to the application's security regime. The method 10 and system 100 further define a strategy to determine which credential should be used if a user has access to multiple credentials, or none at all. In order to execute the application successfully, each connection must contain the database elements such as tables and columns referenced by that application. Put another way, each database must share a common definition of the elements used by the application.

Figure 9:
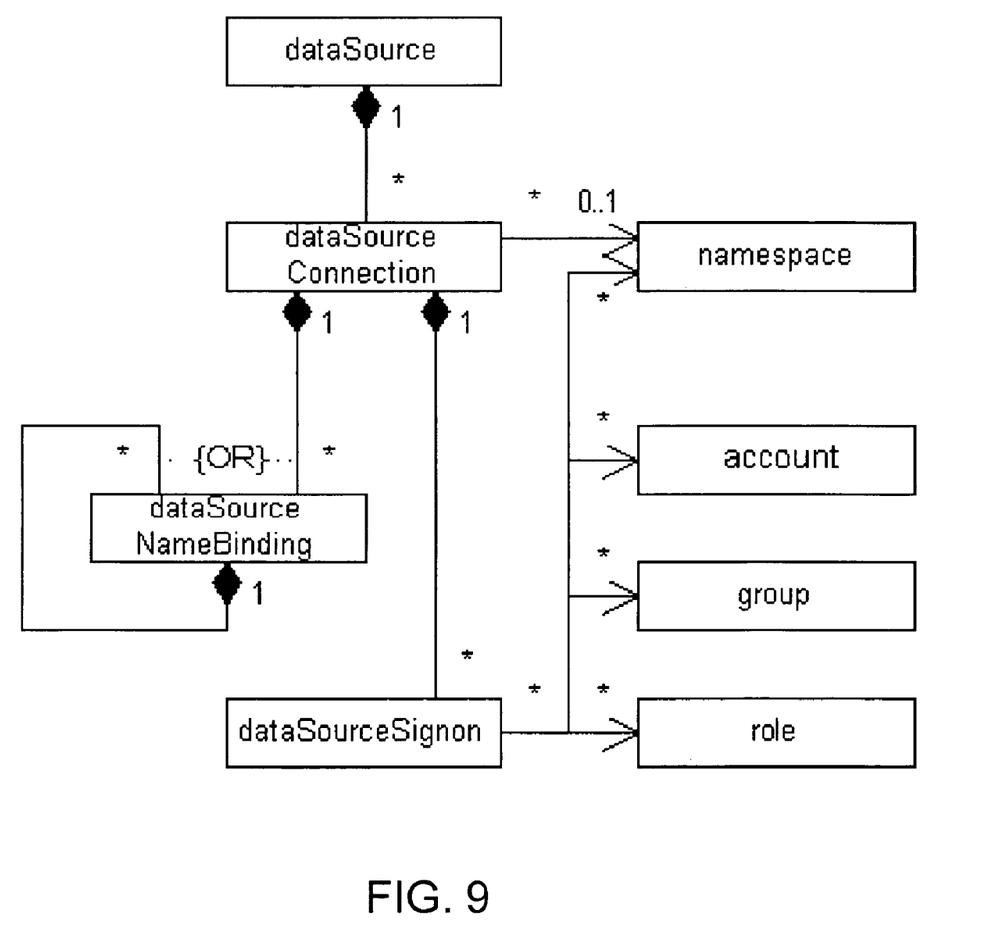
FIG. 9 illustrates a datasource defining the local symbol for contained connections.

As illustrated in FIG. 9 in the form of UML (Unified Modeling Language), the datasource defines the local symbol for the contained connections. The datasource connection defines the information necessary to connect to a physical database. The details of this information are typically vendor specific.

In addition, a connection can refer to a namespace that is used to obtain database credentials for a user attempting to use that connection. The datasource sign-on contains credentials necessary to access the database. In addition, certain objects can maintain references to security objects, such as "namespace", "account", "group", or "role", which may use those credentials. These objects are known as "consumers" of the data source sign-on.

In an embodiment of the present invention, a datasource name binding structure is defined to allow the application to handle local variances in names of database elements for that connection. An application determines the datasources it needs to use based on the specification of the report and the contents of the metadata model used to construct that report. By knowing the required datasources, an application can determine at runtime what connections and credentials to use in order to connect to the necessary databases using the algorithm illustrated in TABLE 1.

TABLE 1

Datasource Connection Algorithm

For each needed datasource (DS):
   Locate all child datasource connections (DSC). If the user has picked
   one, limit the set to that particular DSC.
   If there is more than one DSC, then force the user to select one DSC
   via a prompt. Exit.
   If the DSC has a credential namespace
      Ask security provider for database credentials.
      If none provided → Fault.
      If a credential is provided, use it.
   Else
      Locate all child datasource sign-ons (DSS) that the user is
      allowed to use, based on consumer relationship. If the user has
      picked a DSS previously, limit the set to that particular DSS.
      If there is more than one DSS, force the user to select one DSS TABLE 1-continued Datasource Connection Algorithm via a prompt. Exit.
If a DSS is not available, force the user to enter appropriate
database credentials.

The method 10 and system 100 provide for the connectivity isolation of multiple datasources from the time the model is in development, up to and including the run-time environment. In other words, a metadata modeler has no need to know if a model will be used with one or several different datasources at run-time, or what those datasources and their locations will ultimately be. Since the method 10 and system 100 are external to the report itself, a generalized solution is advantageously provided.

A report is built atop a metadata model that in turn refers to a named datasource. As well as containing a reference to the datasource, the metadata model provides a business presentation of the database information for the author of a report to use. The data source itself is defined externally to the metadata model and can therefore be shared across multiple metadata models. The datasource can contain multiple datasource connections from which to choose, that are created and managed externally to the metadata model, and optionally secured to restrict user access.

The method 10 and system 100 allow an organization with two or more databases to easily provide secure access to a specified database by specific users. For instance, each datasource connection can be individually secured, allowing one to limit access to certain databases by certain users or groups of users.

The datasource mapping method 10 and system 100 provides a metadata model that references a logical datasource name that can "own" many datasource connections, each of which provides connection information for a distinct targeted database. This allows reports that reference the metadata model to run against anyone of a plurality of databases "on-the-fly" at run-time without requiring any additional customized programming.

The method's use of a "one-to-many" datasource-to-datasource connections technique provides many advantages. The method 10 and system 100 enable the reuse of an existing metadata model and its associated reports and queries in environments where multiple datasources are used. A general solution is provided for all existing and subsequent reports using the same metadata model. This allows different users to run the same or different reports off the same metadata model against different databases as desired. In other words, the same report can be run at the same time in separate executions against one, two, or more databases as needed, and as defined by the datasource connections. The user is therefore able to target reports at different databases in a run-time environment without requiring disruptive "off-line" changes to the metadata model, or its related reports.

The method 10 and system 100 can also provide the ability to have a computer program run against a user-selected database from a set of previously configured databases at run time, and optionally provide an ability to secure access to those databases to restrict database access to appropriate users.

The method 10 and system 100 provide a solution to allow a logical connection to correspond to multiple physical connections at run-time and "on-the-fly", and enables the restricting of access to connections and credentials to a subset of the users of the system. Therefore, an organization can easily manage the requirement for a program to access different databases over time, and in an embodiment of the present invention, to secure that access.

The method 10 and system 100 simplify the exercise of managing connections to databases. In an embodiment of the present invention, access to connections and credentials can be optionally secured, restricting access to a subset of the plurality of users known to the system. The method 10 further defines an algorithm that can allow an application to prompt a user to select a single connection, or a single security credential if several are accessible by that user. In addition, the algorithm can ensure that the user is prompted if their credentials are required, when none have yet been given.

The datasource mapping method 10 and system 100 according to the present invention, and methods described above, may be implemented by any hardware, software or a combination of hardware and software having the above-described functions. The software code, either in its entirety or a part thereof, may be in the form of a computer program product such as a computer-readable memory having the system and/or method stored therein.

Furthermore, a computer data signal representation of that software code may be embedded in a carrier wave for transmission via communications network infrastructure. Such a computer program product and a computer data signal are also within the scope of the present invention, as well as the hardware, software and combination thereof.

Therefore, although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A method of providing metadata models for use in a reporting component of a business intelligence system the method comprising the steps of:
    establishing a metadata model;
    defining a logical datasource within said metadata model;
    creating a datasource connection, the datasource connection being external to the metadata model;
    incorporating connecting information of a physical datasource into the datasource connection;
    associating said logical datasource with the datasource connection;
    mapping said logical datasource to the physical datasource using mapping information incorporated within said datasource connections associated with said logical datasource; and
    providing the metadata model to connect to the physical datasource for generating a business intelligence report.

2. The method according to claim 1, wherein the datasource connection provides security to the physical datasource by limiting user access.

3. The method according to claim 1 wherein the physical datasource has a plurality of datasource connections.

4. The method according to claim 1, further comprising the step of limiting access to a physical datasource by user and/or user group.

5. The method according to claim 1, further comprising the step of associating a user credential with the datasource connection.

6. The method according to claim 1 further comprising the step of prompting a user to select a single source connection when two or more datasource connections are accessible.

7. The method according to claim 1 further comprising the step of defining a datasource name-binding structure to enable an application to handle local variances in database element names for a connection.

8. The method according to claim 1, wherein the physical datasource mapping information includes server name and port numbers.

9. A business intelligence system for generating a business intelligence report, the system comprising:
    means for establishing a metadata model;
    means for defining a logical datasource within said metadata model;
    means for creating a datasource connection, the datasource connection being external to the metadata model;
    means for incorporating connecting information of a physical datasource into the datasource connection;
    means for associating said logical datasource with the datasource connection;
    means for mapping said logical datasource to the physical datasource using mapping information incorporated within said datasource connections associated with said logical datasource; and
    means for providing the metadata model to connect to the physical datasource for generating a business intelligence report.

10. A storage medium readable by a computer encoding a computer program for execution by the computer to carry out a method for providing metadata models for use in a reporting component of a business intelligence system, the computer program comprising:
    code means for establishing a metadata model;
    code means for defining a logical datasource within said metadata model;
    code means for creating a datasource connection, the datasource connection being external to the metadata model;
    code means for incorporating connecting information of a physical datasource into the datasource connection;
    code means for associating said logical datasource with the datasource connection;
    code means for mapping said logical datasource to the physical datasource using mapping information incorporated within said datasource connections associated with said logical datasource; and
    code means for providing the metadata model to connect to the physical datasource for generating a business intelligence report.

* * * * *